Nov. 24, 1953  T. S. LASKY  2,660,316
FILTER UNIT
Filed Feb. 20, 1950

Thomas S. Lasky
INVENTOR.

Patented Nov. 24, 1953

2,660,316

UNITED STATES PATENT OFFICE 2,660,316

FILTER UNIT

Thomas S. Lasky, Kingston, Pa.

Application February 20, 1950, Serial No. 145,234

1 Claim. (Cl. 210—131)

This invention relates to an improved filter unit adapted to form part of an oil filter of the type disclosed in my U. S. Patent No. 2,487,146, November 8, 1949.

An object of the present invention is to provide a filter unit of the above kind which is simple in construction, convenient to refill with a filtering material or cartridge, and efficient in use.

Another object is to provide a filter unit wherein the container for the filtering material or cartridge includes a perforate body having a fixed flat bottom wall, a central tube fixed at its lower end in said bottom wall and having lateral openings intermediate its ends, and a removable flat cover fitted in and seated on the upper end of said body and slidably fitted on the upper portion of said tube, wherein a nut disk or plate is removably screwed onto the upper end of said tube to secure the cover in place, and wherein the bottom wall and the nut disk or plate respectively have tapered seats formed in their lower and upper faces to take tapered gaskets for providing oil-tight seals between the ends of said tube and the central post of an outer casing that extends through said tube. This avoids provision of the ends of the tube with the seats and provides the seats where they may be readily formed of such large size as to insure efficient sealing.

The exact nature of the present invention will be apparent from the following description when considered with the accompanying drawing, in which.

Figure 1:
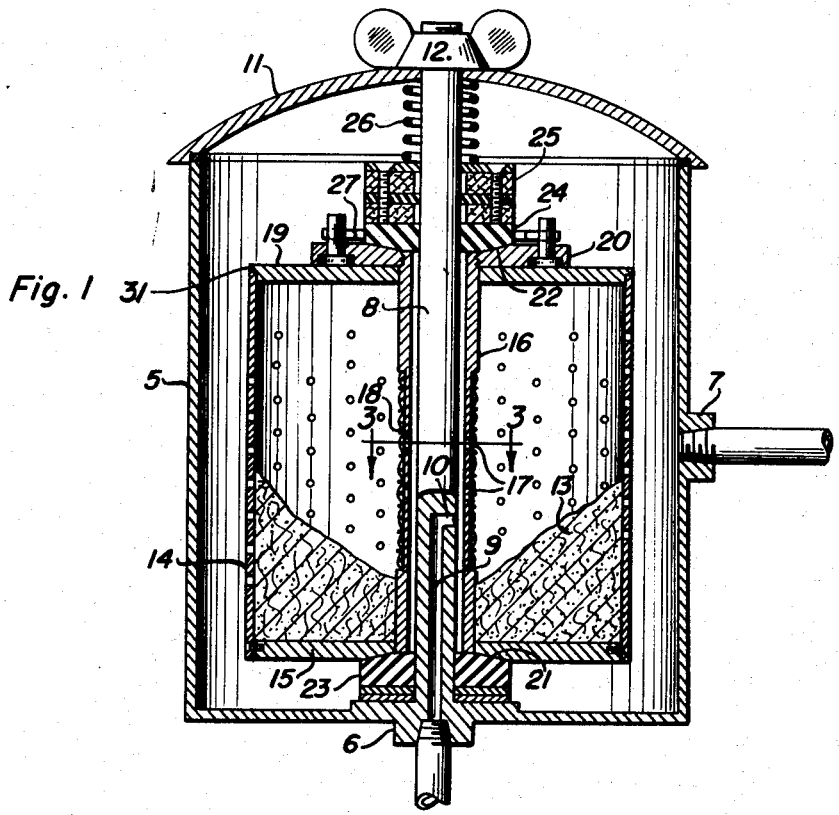
Figure 1 is a central vertical sectional view of a filter embodying a filter unit constructed in accordance with the present invention.
Figure 2:
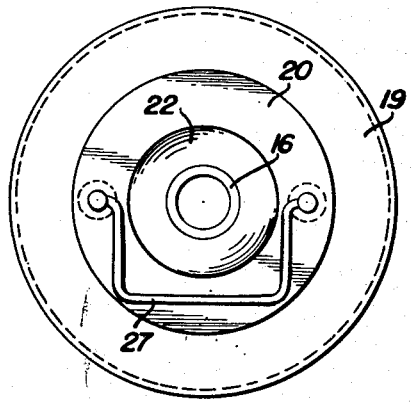
Figure 2 is a top plan view of the filter unit.
Figure 3:
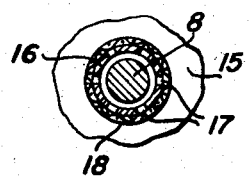
Fig. 3 is a horizontal section taken on the line 3—3 of Figure 1.

Referring in detail to the drawing, 5 indicates the body of an imperforate outer container having central bottom and side oil pipe connections 6 and 7. A solid post 8 is disposed centrally of and rigidly connected at its lower end to the bottom of said outer container and has an axial passage 9 in its lower portion leading upwardly from the bottom pipe connection 6 and a lateral passage 10 leading from the upper end of the passage 9 and opening through the periphery of the post. The post 8 extends above the top of the body 5, a domed cover 11 for the body 5 is removably fitted on the upper end of said post, and a wing nut 12 is screwed on said post to secure the cover 11 in place.

The present filter unit includes a container for filtering material 13, which container includes a body having a perforated cylindrical wall 14, a flat bottom wall 15 tightly fitted and fixedly secured in the lower end of the wall 14, and a central tube 16 swaged or otherwise fixed at its lower end in the bottom wall 15 and having lateral openings 17 intermediate its ends which are screened as at 18. The container of the filter unit also includes a removable flat cover 19 which is fitted in the upper end of the body wall 14 and slidably fitted on the upper portion of the tube 16 and has a lip 31 seated on the upper end of the body wall 14. A nut disk or plate 20 is removably screwed onto the upper end of tube 16 and against the cover 19 to secure the latter in place. A tapered seat 21 is formed in the bottom face of the bottom wall 15, and a similar seat 22 is formed in the upper face of nut disk or plate 20, said seats surrounding the central openings of wall 15 and disk or plate 20 at the ends of tube 16. A tapered gasket 23 is fitted on post 8 and engages the seat 21, and a similar gasket 24 is fitted on said post and engages the seat 22. A conventional follower and oil seal 25 is slidably fitted on the post 8 above and against the gasket 24, and a helical spring 26 disposed on the post between the cover 11 and the element 25 forces the parts down so as to cause tight engagement of the gaskets 23 and 24 with their seats and the post 8 and thereby prevent escape of oil from the ends of tube 16.

The nut disk or plate has a hinged bail handle 27 for use in turning the same.

From the foregoing description, the nature and advantages of the invention will be understood and appreciated by those skilled in the art.

What is claimed as new is:

For use in an oil filter having an imperforate outer container with central bottom and side oil connections, a post rigidly connected to the bottom and extending axially through said outer container, an oil connection through said post, a filter unit comprising an inner container including a cylindrical wall having perforations, a relatively thick bottom wall as compared to the cylindrical wall, said bottom wall being tightly fitted and rigidly secured to the lower end of said cylindrical wall, said bottom wall having a central aperture therein, an axially positioned tube rigidly secured in said aperture, said tube extending above the top of the cylindrical wall, a flat removable cover slidably fitting said cylindrical wall and said tube, a lip on said cover overlying the end of the cylindrical wall, the end of said tube being threaded, a nut disk threadedly engaging the end of said tube, a tapered gasket seat on the outer face of said nut disk, and a tapered gasket seat on the outer surface of said bottom wall.

THOMAS S. LASKY.

References Cited in the file of this patent

UNITED STATES PATENTS

| Number | Name | Date |
|---|---|---|
| 2,201,418 | Williams et al. | May 21, 1940 |
| 2,362,530 | Bennett | Nov. 14, 1944 |
| 2,429,321 | La Breque | Oct. 21, 1947 |
| 2,453,405 | Bolser | Nov. 9, 1948 |
| 2,487,146 | Lasky | Nov. 8, 1949 |
| 2,601,404 | Lasky | June 24, 1952 |